Sept. 30, 1952 M. B. JOHNSON 2,612,381
FIFTH WHEEL LOCKING MECHANISM
Filed April 7, 1948
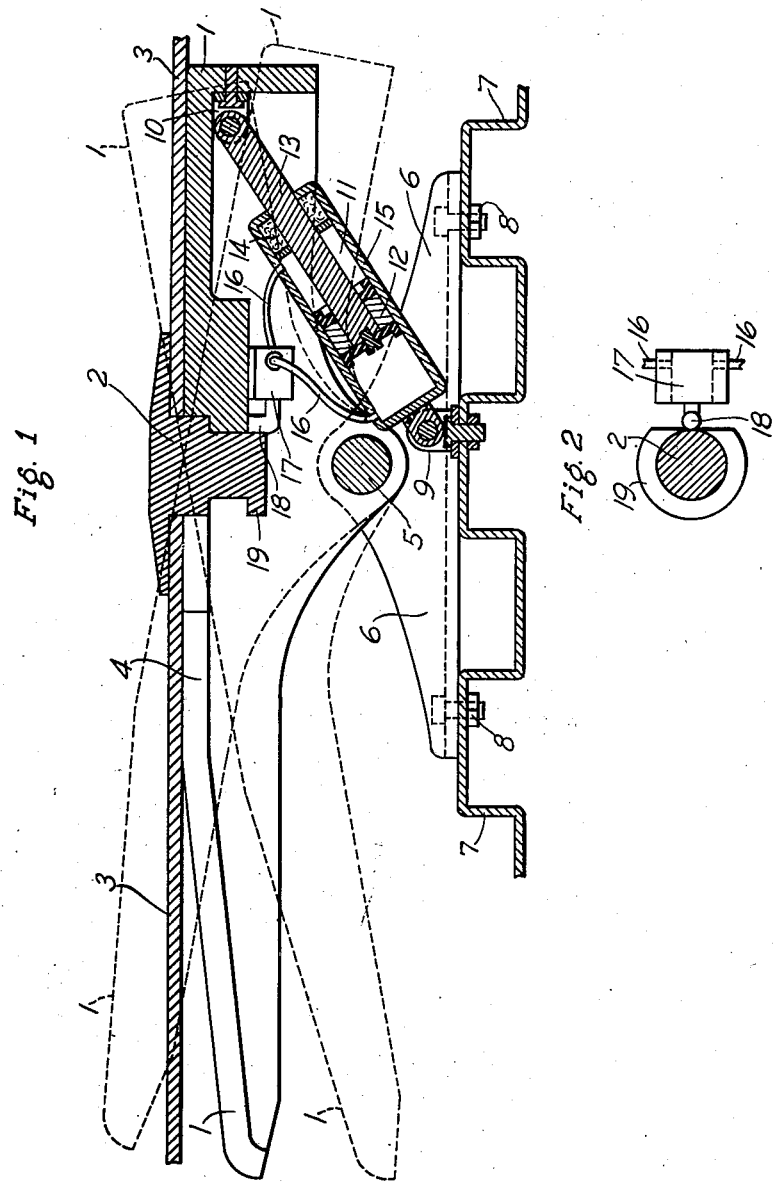
INVENTOR.
M Bernard Johnson Patented Sept. 30, 1952

2,612,381

UNITED STATES PATENT OFFICE 2,612,381

FIFTH WHEEL LOCKING MECHANISM

Marvin Bernard Johnson, Montgomery, Ala., assignor of sixty-seven and one-half per cent to D. W. Hodo and twenty-seven and one-half per cent to W. D. Bach Application April 7, 1948, Serial No. 19,571

5 Claims. (Cl. 280—33.05)

The present invention relates to fifth wheels for tractors and trailers arranged to be hauled by said tractors.

The object of the invention is to provide a new, simple, inexpensive, and practical fifth wheel for tractors and trailers, said fifth wheel having the normal freedom of oscillatory motion on a horizontal axis when the tractor and trailer are in line with each other, or nearly so, and being automatically locked, or capable of being selectively locked, against such oscillatory motion when the axes of the tractor and trailer are disposed at more than a predetermined angle with respect to each other.

The invention contemplates means for automatically preventing tilting of the trailer forepart when the latter is in a jackknifed position with respect to the tractor. In ordinary hauling use the fifth wheel of the present invention may oscillate on a horizontal axis normal to the longitudinal axis of the tractor, even when the two vehicles are going around curves of fairly wide radius; but when the tractor is disposed at a considerable angle to the trailer, as in parking, or when a sudden deceleration of the tractor causes the trailer to seek to override the tractor and to assume a jackknifed position with respect to the latter, the fifth wheel is automatically prevented from oscillating on said axis, and a firm support is thereby provided for the forepart of the trailer. It will be apparent that such prevention of oscillatory motion of the fifth wheel may also be obtained selectively, as by means operable by the driver of the tractor.

In the drawing:

Fig. 1 is a longitudinal axial section in elevation of the fifth wheel of the present invention, showing, also in section, the plate and kingpin of the trailer.

Fig. 2 is a detail, in plan, of the kingpin of the trailer and a valve that the same controls.

In Fig. 1 the member commonly referred to in the art as the fifth wheel, i. e., the female member that receives the kingpin of the trailer, is designated 1. In solid lines the member 1 is shown in a normal horizontal position; in dotted lines the member 1 is shown in two other positions which may be arbitrarily taken as the two alternate extreme positions.

The member 1 is preferably a steel casting, following the usual design, having a smooth upper surface upon which the bottom of the trailer plate normally slides during changes in the angular disposition of the tractor with respect to the trailer, the rear portion of said smooth upper surface (i. e., that portion to the left in Fig. 1) being beveled and having the usual slot for receiving the kingpin.

The kingpin of the trailer is designated 2, the trailer plate 3 (shown only in the normal horizontal position, solid lines, Fig. 1), and the slot into which the kingpin is received is designated 4. The member 1 is pivotally mounted on a shaft 5 (seen in section only, Fig. 1) which is supported by a pair of suitable brackets—one of which is shown and is designated 6—each such bracket being secured in any suitable manner to a mounting plate 7—here shown to be corrugated—the bracket being illustrated as secured to the mounting plate by means of bolts and nuts 8, 8, and the mounting plate being assumed to be secured to the tractor frame (not shown).

Pivotally attached beneath the member 1 to a bracket 9 mounted on the mounting plate 7, and also pivotally attached to another bracket 10 on the under side of the front part of the member 1, is a hydraulic lock 11, comprising a piston 12, a piston rod 13, a gland 14, and a cylindrical casing 15. A conduit 16 connects both ends of the cylindrical casing 15 (see Fig. 1). In said conduit, and attached in any suitable manner to the underside of member 1, as shown, is a valve 17 arranged to be opened and closed by means of a plunger 18, shown in Fig. 1 as having an offset outer end which is normally in contact with a flattened portion of the periphery of a flange 19 on the lower end of the kingpin 2 (see Figs. 1 and 2). When such plunger is engaging the flattened portion of the periphery of the flange 19 the plunger is relatively withdrawn from the valve casing and the valve is open (not illustrated) so that liquid may pass through the conduit 16 from one end of the cylindrical casing 15 to the other end thereof. The cylindrical casing is preferably filled with oil. A reservoir in series with conduit 16 might be included as a modification.

The arbitrary cam formed by flattening a portion of the periphery of flange 19 is shown in Fig. 2 most clearly to be of circular form with a segment cut away by a chord. Numerous other cam forms may be used. In Fig. 2 the trailer is assumed to be in line with the tractor; and the end of the plunger 18 rests against the middle of the flattened portion of the periphery of the flange 19. As the trailer is disposed at more than a predetermined angle with respect to the tractor it will be understood that the end of plunger 18 is pushed inwardly with respect to the valve 17, and when the end of plunger 18 engages the uninterrupted circular peripheral portion of the flange 19 the valve 17 is closed, and liquid within the cylindrical casing 15 and the conduit 16 cannot circulate and the piston rod 13 cannot move, so that, as a consequence, the fifth wheel, i. e., member 1, cannot oscillate in a normal manner and permit the forepart of the trailer to tip to one side.

Thus when the angle between the axes of the tractor and trailer is greater than half the angle defining the flattened portion of the flange 19 the fifth wheel is automatically locked against oscillation.

It will be understood of course that the valve 17 may be controlled by any of a variety of equivalent modifications, where the locking of the fifth wheel is desired to be controlled automatically by the angular relationship of the tractor to the trailer, or by any of a variety of selective means operated by the driver of the tractor from, say, the cab thereof.

I claim:

1. The combination with a tractor and trailer of a fifth wheel pivotally mounted on said tractor and normally free to oscillate on a horizontal axis transverse to said tractor, a kingpin on said trailer engaging said fifth wheel, a hydraulic lock mounted between the fifth wheel and the tractor arranged to prevent oscillation of said fifth wheel on said axis when liquid within said lock is prevented from moving, a valve controlling the movement of said liquid, and means carried on said kingpin opening and closing said valve in accordance with the angular relationship between said tractor and said trailer.

2. The combination with a tractor and trailer of a fifth wheel pivotally mounted on said tractor and normally free to oscillate on a horizontal axis transverse to said tractor, means pivotally connecting said trailer to said fifth wheel, a hydraulic lock mounted between the fifth wheel and the tractor arranged to prevent oscillation of said fifth wheel on said axis when liquid within said lock is prevented from moving, a valve controlling the movement of said liquid, and means carried on said trailer opening and closing said valve in accordance with the angular relationship between said tractor and said trailer.

3. The combination with a tractor and trailer of a fifth wheel pivotally mounted on said tractor and normally free to oscillate on a horizontal axis transverse to said tractor, a kingpin on said trailer engaging said fifth wheel, a hydraulic lock mounted between the fifth wheel and the tractor arranged to prevent oscillation of said fifth wheel on said axis when liquid within said lock is prevented from moving, a valve controlling the movement of said liquid, and means associated with said valve for opening and closing said valve to control the movement of the liquid.

4. A fifth wheel assembly comprising a plate adapted for attachment to a tractor, a fifth wheel mounted on said plate and normally free to oscillate on a horizontal axis transverse to the plate, a hydraulic lock mounted between the fifth wheel and the plate to prevent oscillation of said fifth wheel on said axis when fluid within said lock is prevented from moving, a valve controlling the movement of said fluid, and means associated with said valve for opening and closing said valve to control the movement of said fluid.

5. In combination with a tractor, a fifth wheel pivotally mounted on said tractor and normally free to oscillate on a horizontal axis transverse to said tractor, a hydraulic locking mechanism preventing oscillation of said fifth wheel on said axis when liquid within said locking mechanism is prevented from moving, a valve controlling the movement of said liquid, and means associated with said valve for opening and closing said valve to control the movement of the liquid.

MARVIN BERNARD JOHNSON.

REFERENCES CITED

The following references are of record in the file of this patent:

UNITED STATES PATENTS

| Number | Name | Date |
|---|---|---|
| 903,884 | Przygode | Nov. 17, 1908 |
| 1,519,451 | Harris | Dec. 16, 1924 |
| 1,920,192 | Fox | Aug. 1, 1933 |
| 2,391,372 | Weigand | Dec. 18, 1945 |
| 2,441,293 | Seyferth | May 11, 1948 |
| 2,442,914 | Apgar | June 8, 1948 |
| 2,461,212 | Hanna | Feb. 8, 1949 |